(12) United States Patent
Mizukami

(10) Patent No.: US 6,491,450 B1
(45) Date of Patent: Dec. 10, 2002

(54) SHUTTER FOR A CAMERA

(75) Inventor: Hiroyuki Mizukami, Chiba (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/663,879

(22) Filed: Sep. 15, 2000

(30) Foreign Application Priority Data

Sep. 16, 1999 (JP) .......................................... 11-261333

(51) Int. Cl.$^7$ ................................................. G03B 9/08
(52) U.S. Cl. ...................................... 396/453; 396/455
(58) Field of Search ................................ 396/475, 463, 396/213, 455, 493, 453, 464, 467, 468, 469

(56) References Cited

U.S. PATENT DOCUMENTS

| | | | |
|---|---|---|---|
| 3,604,330 A | * 9/1971 | Fahlenberg et al. | 396/455 |
| 4,302,090 A | * 11/1981 | Kiuchi et al. | 396/455 |
| 4,408,857 A | * 10/1983 | Frank | 396/242 |
| 4,697,908 A | * 10/1987 | Ogihara et al. | 396/244 |
| 4,984,003 A | * 1/1991 | Matsumoto et al. | 396/213 |

* cited by examiner

Primary Examiner—David M. Gray
Assistant Examiner—Michelle Nguyen
(74) Attorney, Agent, or Firm—Adams & Wilks

(57) ABSTRACT

To prevent rebounding motion of sectors caused in stopping the sectors and achieve small-sized formation of a shutter, there is provided a shutter for a camera including sectors for opening and closing a shutter opening by reciprocal and pivotal movement, a motor for reciprocally and pivotally moving the sectors by forwardly and reversely rotating a rotor of the motor by applying current to a coil in forward and reverse directions, a control circuit for controlling current applied to the coil for exposure control in accordance with a brightness of an object to be photographed and a memory circuit for outputting data used for applying current to the control circuit in correspondence with operational characteristics of the motor and the sectors. The memory circuit is provided with current data for applying current to the coil for rotating the rotor in a direction reverse to a rebounding direction of the sectors to prevent a rebounding motion of the sectors.

9 Claims, 3 Drawing Sheets

SHUTTER FOR A CAMERA

BACKGROUND OF THE INVENTION

The present invention relates to a shutter for a camera having a motor for effecting opening and closing of a set of shutter sectors, and more particularly to a shutter for a camera in which forward and reverse pulses are applied to the motor to prevent rebounding motion of the sectors.

In a shutter for a camera having a motor or actuator for rotating a rotor formed of a permanent magnet by conducting electricity to a coil and opening and closing a shutter opening by operating a plurality of sectors driven by the motor, it is well known that at a position at which the sectors are fully opened or a position at which the sectors are completely closed, the actual positions of the sectors differ from desired positions thereof due to the inertia of the moving parts including the rotor, the sectors, and the like. This is commonly referred to as the bounding or rebounding phenomenon. The drawbacks associated with rebounding motion include the possibility that portions of the sectors remain covering the shutter opening after the sectors are intended to be fully opened, or re-exposure may be caused after the sectors are intended to be fully closed.

Conventionally, these drawbacks have been resolved by opening the sectors beyond the shutter opening or by closing the sectors to a greater degree than otherwise necessary to avoid the influence of rebounding of the sectors.

According to one such conventional method for overcoming the rebounding phenomenon, an outer diameter of the shutter is increased by a given amount to avoid rebounding of the sectors. However, this creates the problem that a small-sized shutter opening becomes difficult to obtain. Further, even if the sectors have been fully opened, the timing at which the sectors are to be shifted to a closing operation may nonetheless be affected by the rebounding phenomenon and a normal exposure operation may be hampered.

SUMMARY OF THE INVENTION

In order to resolve the above-described problems, after finishing a shutter opening operation and a shutter closing operation of the sectors, current is applied to a coil of the motor for a short period of time to rotate a rotor of the motor in a direction reverse to a rebounding direction of the sectors and rotation of the rotor is decelerated to reduce the rebounding motion of the sectors as much as possible.

According to an aspect of the invention, there is provided a shutter for a camera comprising a shutter opening, sectors for opening and closing the shutter opening by reciprocal pivotal movement, a motor for reciprocally and pivotally moving the sectors by forwardly and reversely rotating a rotor by application of forward and reverse currents to a coil disposed around the rotor, a memory circuit for storing electrical conduction data used for exciting the coil and corresponding to operational characteristics of the motor and the sectors, and a control circuit for controlling the application of current to the coil in accordance with the electrical conduction data and the brightness of an object to be photographed and executing exposure control in accordance with the brightness of the object, wherein the electrical conduction data comprises driving pulses for driving the sectors in a forward and reverse directions and brake pulse data used for generating braking pulses for exerting a force on the sectors in a direction opposite a direction of a rebounding motion of the sectors near or after completion of opening and closing operations of the sectors, and the control circuit outputs a control signal for controlling the application of electricity to the coil be reading specific electrical conduction data from the memory circuit in accordance with the brightness of the object to be photographed.

DETAILED DESCRIPTION OF THE PREFERRED EMBODIMENTS

Figure 1:
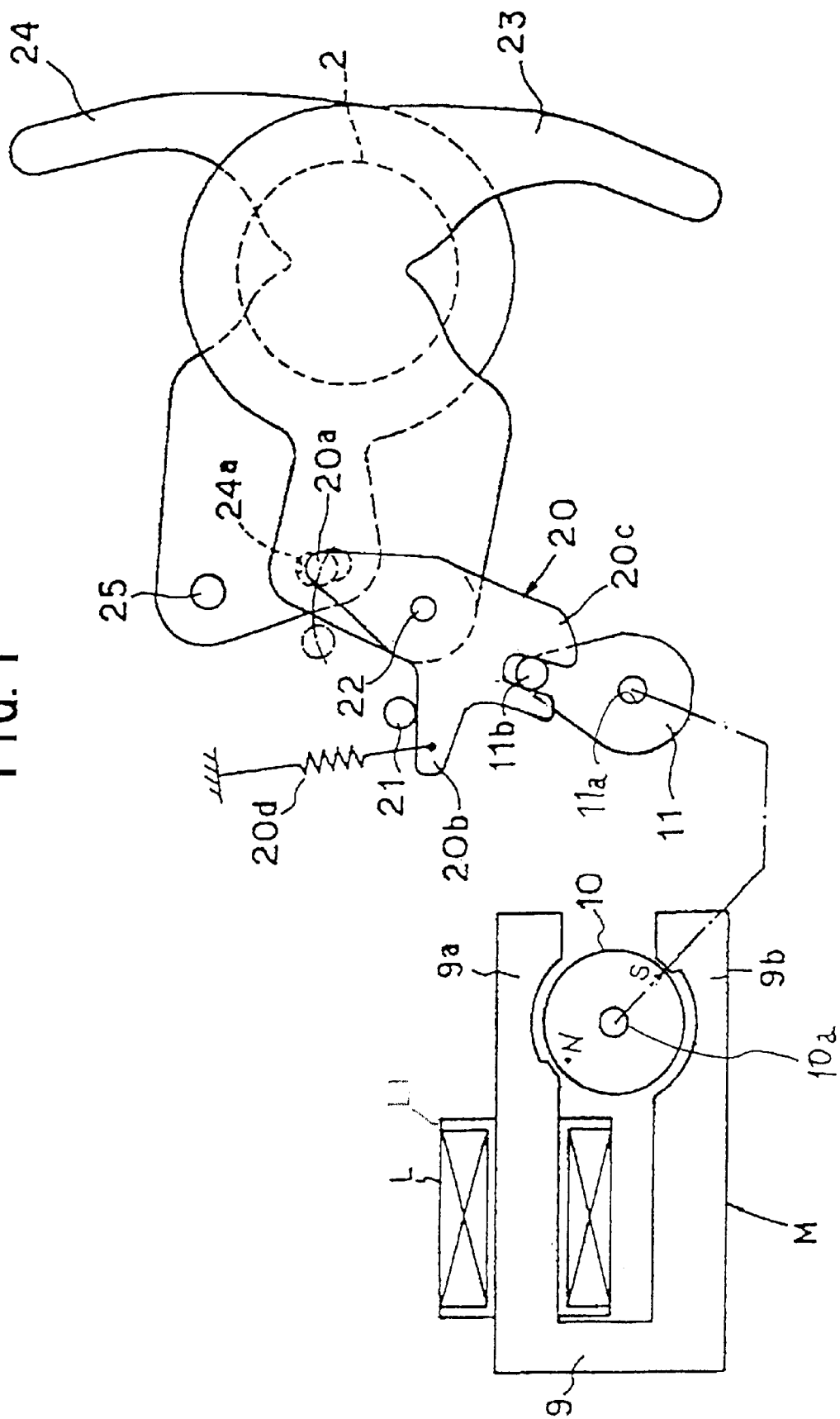
FIG. 1 is a plan view showing an initial state of a shutter for a camera according to an embodiment of the present invention.

An explanation will be given of an embodiment of the invention with reference to the attached drawings. In FIG. 1, a stator 9, a rotor 10 and a coil L constitute a swing motor M which is an actuator. The stator 9 is provided with a coil bobbin L1 wound with the coil L and by conducting electricity to the coil L, an N pole and an S pole are selectively generated at pole portions 9a and 9b of the stator 9. By changing the direction of conducting electricity to the coil, the rotor 10 can be rotated both in a forward (clockwise) direction and a reverse (counterclockwise) direction.

A set of shutter sectors 23 and 24 driven by rotation of the swing motor M are arranged symmetrically relative to a shutter opening 2. The sector 24 is pivotably supported on a shaft 25 projected from a base plate (not illustrated), and the sector 23 is supported pivotably on a shaft 22 projected from the base plate. A sector opening-and-closing lever 20 is pivotably supported on the shaft 22 as projected from the upper surface of the sector 23. A spring 20d is provided at an arm portion 20b of the sector opening-and-closing lever 20 and urges the sector opening-and-closing lever 20 in the clockwise direction as viewed in FIG. 1. The sector opening-and-closing lever 20 is brought into contact with a pin 21 provided at the base plate to thereby restrict further rotation in the clockwise direction. A pin 20a provided at one end of the sector opening-and-closing lever 20 is engaged with the sector 23 and is further engaged with a groove portion 24a of the sector 24 to thereby drive the sectors 23 and 24. A fork portion 20c is provided at other end (lower side of the drawing) of the sector opening-and-closing lever 20 and engages with a pin 11b of a rotor operating lever 11.

The rotor operating lever 11 has a hole portion 11a fixedly press-fitted to a rotating shaft 10a of the rotor 10 and the rotor operating lever 11 moves integrally with the rotor 10. The pin 11b provided at one end of the rotor operating lever 11 slidably engages with the fork portion 20c of the sector opening-and-closing lever 20. Therefore, when the rotor 10 is rotated or angularly displaced in the clockwise (or counterclockwise) direction, the rotor operating lever 11 is also pivotally moved or angularly displaced in the clockwise (or counterclockwise) direction whereupon the sector opening-and-closing lever 20 is pivotally moved or angularly displaced in the counterclockwise (or clockwise) direction by rotor operating lever 11 to thereby operate the sectors 23 and 24.

Figure 2:
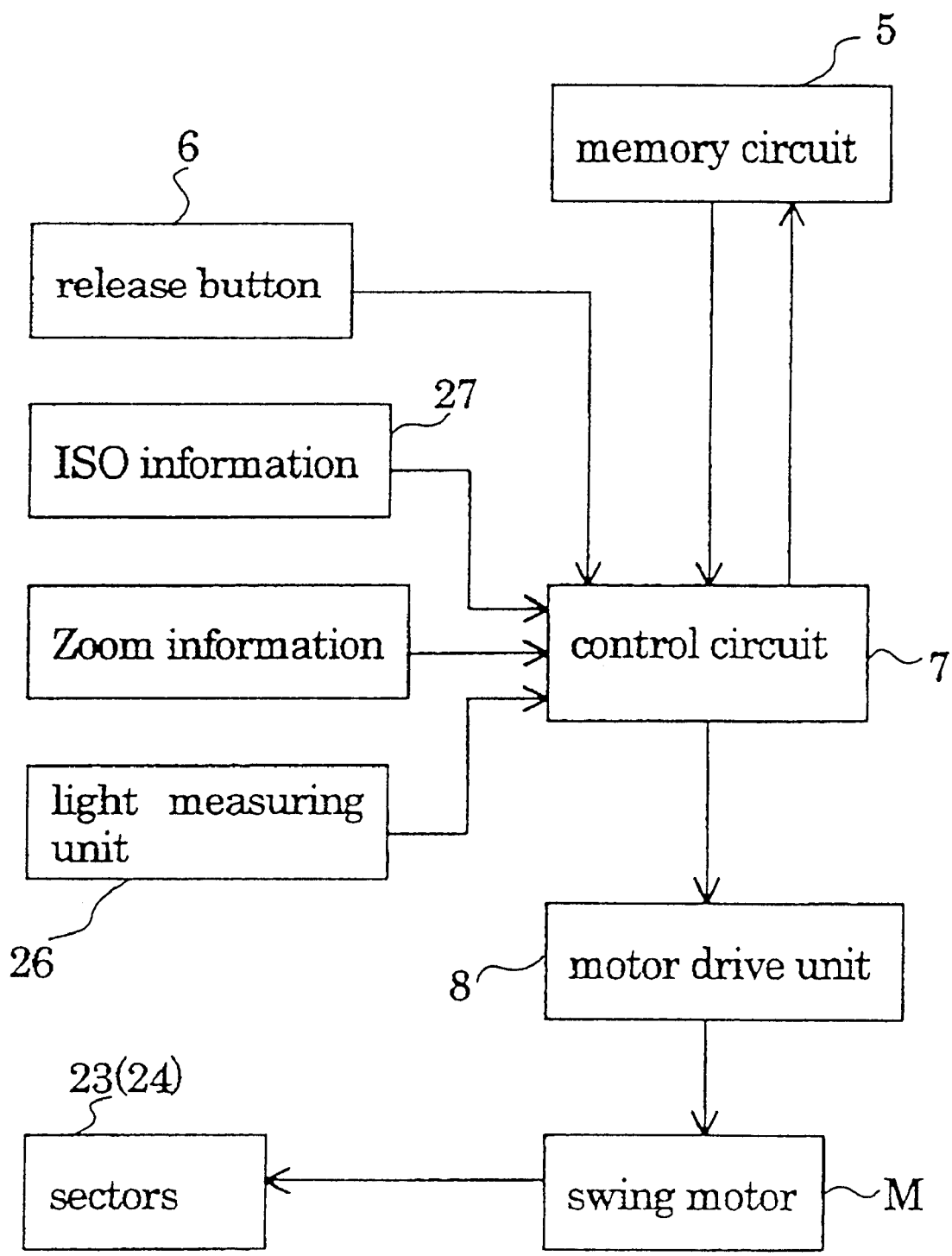
FIG. 2 is a block diagram of the shutter for a camera according to the embodiment of the invention.

Referring to FIG. 2, the rotation or angular displacement (e.g., pivotal movement) of the rotor 10 is carried out by a motor drive unit 8 provided in a camera main body (not shown). The rotor drive unit 8 pivotally or angularly drives the rotor 10 by receiving electrical conduction data from a control circuit 7. The control circuit 7 reads information of film sensitivity from an ISO information reading circuit 27, information of brightness of an object to be photographed from a light measuring unit 26 and, depending on the sophistication of the shutter, other information affecting the exposure value, determines an exposure amount, and reads the electricity conduction data of an electricity conduction time period and an electricity conduction direction for operating the rotor 10 in correspondence with the exposure amount from a memory circuit 5. Details of the content of the electricity conduction data will be described later.

An explanation will be given of operation of such a motor-controlled shutter device. FIG. 1 shows a state before operating the shutter. In this state, when a release button 6 of the camera shown in FIG. 2 is initially operated, the exposure positions of the sectors 23 and 24 are determined by the control circuit 7 according to brightness information of the object to be photographed read from the light measuring unit 26, film sensitivity information read from the ISO information reading circuit 27, zoom information, and the like shown in FIG. 2. Thereafter, the electricity conduction data for driving the sectors 23 and 24 to the desired exposure positions is read from the memory circuit 5. In order to drive the sectors 23 and 24 to the desired exposure positions, electricity is conducted to the coil L shown in FIG. 1 by the control circuit 7 via the motor drive unit 8.

By way of example, by conducting electricity to the coil L, firstly, an S pole is generated at the pole portion 9a of the stator 9 and an N pole is generated at the pole portion 9b and the rotor 10 is rotated or angularly displaced in the clockwise direction. By the rotational movement of the rotor 10, the rotor operating lever 11 which is fixedly press-fitted to the rotor 10 is also pivotally moved in the clockwise direction on the shaft 11a thereof and accordingly, by pivotally moving the rotor-operated lever pin 11b in the clockwise direction, the sector opening-and-closing lever 20 is pivoted in the counterclockwise direction. In accordance therewith, the sectors 23 and 24 are pivotally moved in directions opposed to each other via the sector opening-and-closing lever pin 20a provided on the sector opening-and-closing lever 20 and the exposure opening starts to form.

The sectors 23 and 24 are pivotally moved to predetermined exposure positions determined by the control circuit 7 in accordance with brightness information of an object to be photographed obtained from the light measuring unit 26 shown in FIG. 2, the ISO information 27 of film sensitivity, and the like. Thereafter, electricity is conducted to the coil L in the reverse direction, the rotor is rotated in the reverse direction (operation in the counterclockwise direction), the exposure is finished and the sectors 23 and 24 return to the state shown in FIG. 1.

In this case, the electrical conduction data which is used to control the motor drive unit 8 in accordance with an exposure amount determined at the control circuit 7 is output from the memory circuit 5. That is, the electrical conduction data takes into consideration inertia of the rotor 10, the sector opening-and-closing lever 20 and the sectors 23 and 24. Further, the electrical conduction data is data for conducting electricity alternately in the forward and reverse directions such that electricity is conducted in the reverse direction immediately before the sectors 23 and 24 reach the fully opened positions to prevent the rebounding motion caused by inertia from being brought about in the sectors 23 and 24 after the sectors 23 and 24 have reached the fully opened positions and thereafter, electricity is alternately applied in the forward and reverse directions to stabilize movement of the sectors.

Figure 3:
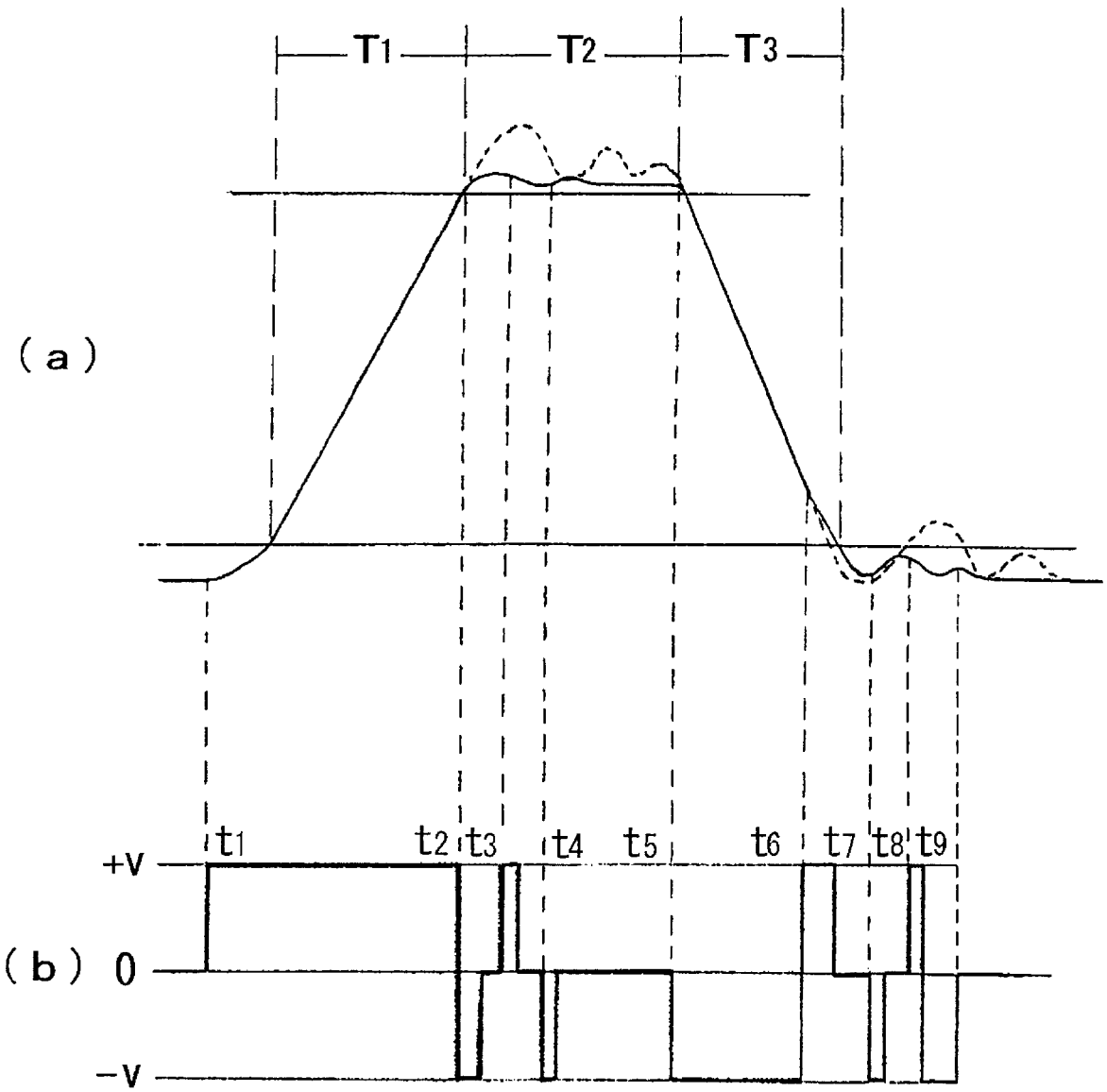
FIGS. 3(a) and 3(b) are timing diagrams showing a relationship between opening and closing operations of the shutter and the application of current to a coil of the motor in the embodiment of the invention.

An explanation will be given next of the operation of the shutter with reference to timing diagrams shown in FIGS. 3(a) and 3(b). FIGS. 3(a) and 3(b) explain electricity conduction data applied to the coil L in correspondence with the opening motion of the sectors 23 and 24. FIG. 3(b) shows a state of conducting electricity to the coil L, the abscissa shows an elapsed time period and the ordinate shows an electricity conduction direction, respectively. The elapsed time period is made to correspond in FIG. 3(a) and FIG. 3(b).

As shown by FIGS. 3(a) and 3(b), when electricity starts conducting to the coil L to move the rotor 10 in the forward direction at time ti by application of a forward driving pulse, the rotor 10 is rotated in the clockwise direction and operates to open the sectors 23 and 24 as mentioned above (period T1). Further, at the end of the shutter opening operation, at time t2 immediately before the sectors 23 and 24 arrive at fully opened positions (period T2), a reverse braking pulse is provided to the coil L and electricity is conducted in the reverse direction for a short period of time by application of the short reverse braking pulse. Therefore, although the sectors 23 and 24 would ordinarily overrun, as shown by a dotted line in FIG. 3(a), this is prevented by applying electricity to the coil L in the reverse direction so that a reverse magnetic field is generated at the magnetic poles 9a and 9b of the stator 9 and the reverse magnetic field operates to forcibly brake the rotor 10.

Therefore, the sectors 23 and 24 do not overrun significantly, and the path of the sectors is represented by a bold line. Thereafter, similarly, in compliance with the direction of motion of the sectors 23 and 24, forward and reverse pulses of opposite polarity are provided as shown by FIG. 3(b) at times t3 and t4 to operate the rotor 10 in directions respectively reverse to the direction of motion of the rotor 10 and electricity is applied alternately in the forward and reverse directions for short periods of time. Thereafter, at time t4–t5, no energy is applied to the rotor 10 to maintain the sectors 23 and 24 in the fully opened position. The times t2, t3 and t4 are determined based on the respective shutter type and can be set substantially uniformly and therefore, the electricity conduction data of the memory circuit 5 can be specified for respective shutter types.

Further, when the sectors 23 and 24 finish a closing operation (period T3) in response to application of a reverse driving pulse at time t5, similar rebounding motion is brought about since the rotor 10 and the sectors 23 and 24 are stopped rapidly. Hence, according to the invention, at time t6 immediately before the closing operation (period T3) has completely finished in response to application of electricity to the coil L in the reverse direction, a forward braking pulse is provided and electricity is applied in the forward or regular direction for a short period of time. Thereafter, depending upon the direction of motion of the sectors 23 and 24, reverse and forward pulses of opposite polarity are applied at times t7 and t8 to operate the rotor 10 in directions respectively reverse to the direction of motion of the rotor 10 and electricity is alternately applied in the reverse and forward directions for short periods of time as shown by FIG. 3(b). Further, although the sectors 23 and 24 would have otherwise operated as shown by a dotted line in FIG. 3(b), the sectors 23 and 24 are operated in a modified manner to avoid rebounding as shown by a solid line.

Although according to the above-described embodiment, a swing motor is used for the actuator, any motor capable of reciprocally and pivotally moving may be used, such as a step motor, an ultrasonic motor, or the like. Further, although electricity is conducted to rotate the rotor in the direction reverse to the rebounding direction at time t2, t3 and t4 in opening the sectors and at time t6, t7, t8 and t9 in closing the sectors, there frequently arises a problem due to the fact that the sectors rebound and return in a direction reverse to a progressing direction. Accordingly, there may be provided only braking pulses for conducting electricity in the progressing direction of the sectors which is carried out at time t3, t7 and t9.

The shutter according to the invention is constructed as described above and accordingly, additional space to accommodate for extra motion of the sectors due to rebounding of the sectors during shutter opening and closing operations is not needed, and the shutter can thus be reduced in size and cost.

Further, since motion of the sectors is stabilized at an early stage, in shifting to regular electricity conduction for finishing a shutter opening operation, the sectors can be shifted to the closing operation at an accurate timing with no influence of rebounding of the sectors and high accuracy exposure control can be achieved.

What is claimed is:

1. A shutter for a camera comprising: sectors for opening and closing a shutter opening by reciprocal pivotal movement; a motor for reciprocally and pivotally moving the sectors by forwardly and reversely rotating a rotor of the motor by applying current to a coil of the motor in forward and reverse directions; a memory circuit for storing electricity conduction data used for applying current to the coil corresponding to operational characteristics of the motor and the sectors; and a control circuit for controlling the application of electricity to the coil in accordance with a brightness of an object to be photographed and executing exposure control in accordance with the brightness of the object; wherein the electricity conduction data is set to comprise data for driving the sectors in a given direction and brake pulse data for exerting a force to the sectors in a direction opposite the given direction to prevent a rebounding motion of the sectors, and the control circuit applies forward and reverse driving pulses to the motor to effect opening and closing of the sectors to perform an exposure by applying the forward driving pulse to open the shutter sectors and thereafter applying a reverse braking pulse followed by alternately applying forward and reverse pulses to prevent rebounding of the shutter sectors after completion of a shutter opening operation, and by applying the reverse driving pulse to close the shutter sectors and thereafter applying a forward braking pulse followed by alternately applying reverse and forward pulses to prevent rebounding of the shutter sectors after completion of a shutter closing operation.

2. A shutter for a camera comprising: a set of sectors displaceable in opening and closing directions to open and close a shutter opening; a motor connected to effect displacement of the sectors in response to forward and reverse pulses applied to the motor; a memory circuit for storing pulse date including the forward pulses and reverse pulses; and a control circuit connected to read pulse data from the memory circuit and apply forward and reverse driving pulses to the motor to effect opening and closing of the sectors to perform an exposure by applying a forward driving pulse to open the shutter sectors and thereafter applying a reverse braking pulse followed by alternately applying forward and reverse pulses to prevent rebounding of the shutter sectors after completion of a shutter opening operation, and by applying a reverse driving pulse to close the shutter sectors and thereafter applying a forward braking pulse followed by alternately applying reverse and forward pulses to prevent rebounding of the shutter sectors after completion of a shutter closing operation.

3. A shutter for a camera according to claim 2; wherein the control circuit reads pulse data from the memory circuit in accordance with the brightness of an object to be photographed.

4. A shutter for a camera to claim 3; wherein the control circuit successively applies to the motor the forward driving pulse having a given pulse width to initiate displacement of the sectors in the opening direction, the reverse braking pulse, one or more pairs of forward and reverse pulses having a shorter pulse width than the given pulse width to prevent rebounding motion of the sectors after completion of the shutter opening operation, the reverse driving pulse having a given pulse width to initiate displacement of the sectors in the closing direction, the forward braking pulse, and one or more pairs of reverse and forward pulses having a shorter pulse width than the given pulse width to prevent rebounding motion of the sectors after completion of the shutter closing operation.

5. A shutter for a camera according to claim 4; wherein the one or more pairs of reverse and forward pulses having a shorter pulse width than the given pulse width comprise pulses of substantially uniform pulse width.

6. A shutter for a camera according to claim 4; wherein the control circuit reads pulse data from the memory circuit in accordance with the brightness of an object to be photographed.

7. A method of operating a shutter for a camera having a set of sectors driven in opening and closing directions by forward and reverse driving pulses applied to a motor to effect an exposure, the method comprising the steps:

applying the forward driving pulse to the motor to initiate opening movement of the sectors in the opening direction;

applying a reverse braking pulse and thereafter alternately applying one or more pairs of forward and reverse pulses to the motor after completion of a shutter opening operation to prevent rebounding of the shutter sectors;

applying the reverse driving pulse to the motor to initiate closing movement of the sectors in the closing direction; and applying a forward braking pulse and thereafter alternately applying one or more pairs of reverse and forward pulses to the motor after completion of a shutter closing operation to prevent rebounding of the shutter sectors.

8. A method according to claim 7; wherein the pulses constituting the one or more pairs of reverse and forward pulses each have a shorter pulses width than that of the forward driving pulse applied to initiate opening movement of the sectors and the reverse pulse applied to initiate closing movement of the sectors.

9. A method according to claim 8; wherein the pulses constituting the one or more pairs of reverse and forward pulses comprise pulses of substantially uniform pulse width.

* * * * *